US012672210B2

(12) United States Patent
Kim et al.

(10) Patent No.: US 12,672,210 B2
(45) Date of Patent: Jun. 30, 2026

(54) ELECTRIC STOVE HAVING SINGLE FREE-ZONE BURNER AND METHOD FOR CONTROLLING SAME

(71) Applicant: COWAY CO., LTD., Gongju-si (KR)

(72) Inventors: Young Kook Kim, Gongju-si (KR); Yeon Soo Seong, Gongju-si (KR); Kyo Eon Oh, Gongju-si (KR); Eui Soon Lee, Gongju-si (KR)

(73) Assignee: COWAY CO., LTD., Gongju-si (KR)

( * ) Notice: Subject to any disclaimer, the term of this patent is extended or adjusted under 35 U.S.C. 154(b) by 808 days.

(21) Appl. No.: 18/000,530

(22) PCT Filed: May 31, 2021

(86) PCT No.: PCT/KR2021/006729
§ 371 (c)(1),
(2) Date: Dec. 2, 2022

(87) PCT Pub. No.: WO2021/246734
PCT Pub. Date: Dec. 9, 2021

(65) Prior Publication Data

US 2023/0225017 A1 Jul. 13, 2023

(30) Foreign Application Priority Data

Jun. 2, 2020 (KR) ........................ 10-2020-0066349

(51) Int. Cl.
*H05B 6/06* (2006.01)
*H05B 6/12* (2006.01)

(52) U.S. Cl.
CPC ........... *H05B 6/065* (2013.01); *H05B 6/1272* (2013.01)

(58) Field of Classification Search
CPC .......... B60N 3/104; F25B 21/02; F25B 21/04; F25B 2321/0252; F25B 25/005;
(Continued)

(56) References Cited

U.S. PATENT DOCUMENTS 6,281,636 B1 8/2001 Okutsu et al.
7,202,451 B2 4/2007 Uchida et al.
(Continued)

FOREIGN PATENT DOCUMENTS

CN 104604328 A 5/2015
CN 109068428 A 12/2018
(Continued)

OTHER PUBLICATIONS

International Search Report mailed on Sep. 28, 2021 in PCT/KR2021/006729 filed on May 31, 2021 (2 pages).
(Continued)

*Primary Examiner* — Quang T Van
(74) *Attorney, Agent, or Firm* — Oblon, McClelland, Maier & Neustadt, L.L.P.

(57) ABSTRACT

An electric stove having a single free-zone burner includes: a controller which outputs a first output signal including a first output level signal and a first synchronization signal, and a second output signal including a second output level signal and a second synchronization signal; a first inverter which successively receives the first output signal and second synchronization signal, and outputs first high-frequency power to a first working coil; and a second inverter which successively receives the first synchronization signal and second output signal, and outputs second high-frequency power to a second working coil. The first inverter and second inverter simultaneously output first high-frequency power and second high-frequency power when the first synchronization signal and second synchronization signal are both received.

9 Claims, 6 Drawing Sheets

(58) Field of Classification Search
CPC ..... F25D 31/008; H05B 6/065; H05B 6/1272; G06F 3/011; G06F 3/013; G06F 3/017; G06F 3/04815; G06F 3/0484; G06T 15/005; G06T 15/50; G06T 19/003; H02M 1/34; H02M 7/48; Y02B 40/00
USPC ....... 219/620, 661, 662, 663, 665, 666, 670, 219/476, 671, 717
See application file for complete search history.

(56) References Cited

U.S. PATENT DOCUMENTS

| | | | | |
|---|---|---|---|---|
| 7,230,216 | B2 | 6/2007 | Uchida et al. | |
| 7,432,481 | B2 | 10/2008 | Uchida et al. | |
| 2005/0199614 | A1 | 9/2005 | Uchida et al. | |
| 2006/0237449 | A1 | 10/2006 | Uchida et al. | |
| 2006/0237450 | A1 | 10/2006 | Uchida et al. | |
| 2007/0125771 | A1 | 6/2007 | Uchida et al. | |
| 2019/0357317 | A1 | 11/2019 | Kwack et al. | |
| 2019/0387585 | A1 | 12/2019 | Cho et al. | |
| 2020/0196398 | A1 * | 6/2020 | Ok | H05B 6/065 |

FOREIGN PATENT DOCUMENTS

| | | | | |
|---|---|---|---|---|
| JP | 2002-124368 | A | 4/2002 | |
| JP | 2011-103225 | A | 5/2011 | |
| JP | 2015-13096 | A | 1/2015 | |
| KR | 10-1075853 | B1 | 10/2011 | |
| KR | 10-2017-0029800 | A | 3/2017 | |
| KR | 10-2017-0123821 | A | 11/2017 | |
| KR | 20170123821 | A * | 11/2017 | H05B 6/065 |
| KR | 10-2018-0040406 | A | 4/2018 | |
| KR | 10-1851889 | B1 | 6/2018 | |
| KR | 10-2018-0092183 | A | 8/2018 | |
| WO | 2013/061595 | A1 | 5/2013 | |

OTHER PUBLICATIONS

Office Action issued in Chinese Patent Application No. 202180039981.9 on Oct. 30, 2025.

Notice of Allowance issued in Chinese Patent Application No. 202180039981.9 on Mar. 30, 2026, citing documents 1-5 therein.

* cited by examiner

| SYNCHRONIZATION SIGNAL | | OUTPUT STAGE SIGNAL | | | | | | | |
|---|---|---|---|---|---|---|---|---|---|
| S1 | S2 | EIGHTH STAGE | SEVENTH STAGE | SIXTH STAGE | FIFTH STAGE | FOURTH STAGE | THIRD STAGE | SECOND STAGE | FIRST STAGE |
| 7bit | 6bit | 0×08 | 0×07 | 0×06 | 0×05 | 0×04 | 0×03 | 0×02 | 0×01 |

| SYNCHRONIZATION SIGNAL | | OUTPUT STAGE SIGNAL | | | | | | | |
|---|---|---|---|---|---|---|---|---|---|
| S1 | S2 | EIGHTH STAGE | SEVENTH STAGE | SIXTH STAGE | FIFTH STAGE | FOURTH STAGE | THIRD STAGE | SECOND STAGE | FIRST STAGE |
| 7bit | 6bit | 0×08 | 0×07 | 0×06 | 0×05 | 0×04 | 0×03 | 0×02 | 0×01 |

FIG. 6

| SYNCHRONIZATION SIGNAL | | OUTPUT STAGE SIGNAL | | | | | | | |
|---|---|---|---|---|---|---|---|---|---|
| S1 | S2 | EIGHTH STAGE | SEVENTH STAGE | SIXTH STAGE | FIFTH STAGE | FOURTH STAGE | THIRD STAGE | SECOND STAGE | FIRST STAGE |
| 7bit | 6bit | 0×08 | 0×07 | 0×06 | 0×05 | 0×04 | 0×03 | 0×02 | 0×01 |

FIG. 7

| SYNCHRONIZATION SIGNAL | | OUTPUT STAGE SIGNAL | | | | | | | |
|---|---|---|---|---|---|---|---|---|---|
| S1 | S2 | EIGHTH STAGE | SEVENTH STAGE | SIXTH STAGE | FIFTH STAGE | FOURTH STAGE | THIRD STAGE | SECOND STAGE | FIRST STAGE |
| 7bit | 6bit | 0×08 | 0×07 | 0×06 | 0×05 | 0×04 | 0×03 | 0×02 | 0×01 |

FIG. 8

ELECTRIC STOVE HAVING SINGLE FREE-ZONE BURNER AND METHOD FOR CONTROLLING SAME

TECHNICAL FIELD

The present invention relates to an electric range having a single free-zone burner and a method of controlling the same, and more particularly, to an electric range for preventing interference noise generated when a single free-zone burner including two or more working coils is operated, and a method of controlling the same.

BACKGROUND ART

Various types of cooking devices are used to heat food at home or in restaurants. Conventionally, gas ranges using gas as fuel have been popularized and widely used, but in recent years, electric ranges for heating vessels, for example, cooking vessels such as pots, using electricity instead of gas have been popularized.

A method by which such an electric range heats a vessel using electricity is mainly classified into a resistance heating method and an induction heating method. Here, the resistance heating method is a method of transferring heat, which is generated when a current flows through a metal resistance wire or a non-metallic heating element such as silicon carbide, to a vessel through radiation or conduction to heat the vessel. The induction heating method uses a magnetic field generated around a working coil when high-frequency power having a certain magnitude is applied to the working coil to generate an eddy current in a vessel made of a metal to heat the vessel itself.

The principle of an induction heating method will be described in more detail as follows. First, when power is applied to an electric range, high-frequency power having a certain magnitude is applied to a working coil. Accordingly, an induction magnetic field is generated around the working coil disposed inside the electric range. When the magnetic lines of force of the induction magnetic field generated in this way pass through a bottom of a vessel including metal components placed on the electric range, an eddy current is generated in the bottom of the vessel. When the eddy current generated in this way flows in the bottom of the vessel, the vessel itself is heated.

An electric range includes a plurality of burners including working coils, a plurality of inverters for outputting high-frequency power to the working coils, and a controller for outputting an output stage signal to the plurality of inverters.

When a user using the electric range places vessels on the plurality of burners to set output stages of the plurality of burners at the same time to cook, the controller sequentially outputs output stage signals to the plurality of inverters, and the plurality of inverters output high-frequency power to the plurality of working coils according to the output stage signals.

As described above, since the output stage signals are sequentially output to the inverters, output timings of high-frequency powers output to the working coils are also different, and thus a difference in resonant frequency between the working coils occurs in an initial output period before the target output is reached. When such a difference value of resonant frequency is included in an audible frequency band, interference noise is generated according to driving of each working coil. Interference noise generated in this way makes a user of an electric range feel uncomfortable and also causes the user to suspect a failure of the electric range.

Korean Registered Patent Publication No. 10-1735754 of Jarwon Electronics Co., Ltd discloses a high-frequency inverter induction coil driving circuit in which, in an induction heating device including a plurality of working coils, switching elements connected to each induction coil are sequentially turned on or off in a time division manner to block interference noise even when the plurality of working coils are simultaneously driven. However, when heating power or an operating frequency is arbitrarily adjusted, when a user issues a heating command to each burner, it is difficult to provide a required output.

As an another method of reducing interference noise of an electric range having a plurality of working coils, there is a method of spacing the working coils as far apart as possible. That is, when a distance between working coils is longer or equal to a certain distance, interference noise is reduced irrespective of the magnitude of a resonant frequency. However, since a volume and size of an electric range increase as the distance between working coils increases, there is a limitation in increasing the distance between the working coils in order to reduce interference noise.

DISCLOSURE

Technical Problem

The present invention is directed to preventing interference noise generated due to a difference in resonant frequency between a plurality of working coils by making output time points of high-frequency powers output from a plurality of inverters the same using a synchronization signal.

The present invention is also directed to, when outputting an output stage signal to any one inverter among a plurality of inverters, outputting a synchronization signal to other inverters to make output time points of high-frequency powers output from the plurality of inverters the same.

The present invention is also directed to, even when any one inverter among a plurality of inverters receives an output stage signal, waiting for output until synchronization signals of other inverters are input to make output times points of high-frequency powers output by the inverters the same.

The technical objects to be achieved by the present invention are not limited to the above-describe technical objects, and other technical objects not described above can be clearly understood by one skilled in the art from the following description.

Technical Solution

According to an embodiment of the present invention, an electric range having a single free-zone burner, which is an electric range for preventing interference noise generated when a single free-zone burner including two or more working coils is operated, includes a single free-zone burner including a first working coil and a second working coil, a controller configured to, when output stages for driving the first working coil and the second working coil are set according to set high-frequency power, output a first output signal including a first output stage signal and a first synchronization signal corresponding to the set output stage and output a second output signal including a second output stage signal and a second synchronization signal corresponding to the set output stage, a power supply configured to output direct current (DC) power, a first inverter configured to sequentially receive the first output signal and the second synchronization signal, convert the DC power into first high-frequency power according to the first output stage signal, and output the first high-frequency power to the first working coil, and a second inverter configured to sequentially receive the first synchronization signal and the second output signal, convert the DC power into second high-frequency power according to the second output stage signal, and output the second high-frequency power to the second working coil, wherein the first inverter and the second inverter simultaneously output the first high-frequency power and the second high-frequency power when receiving both the first synchronization signal and the second synchronization.

When the first output signal is output to the first inverter, the controller may output the first synchronization signal to the second inverter.

When the second output signal is output to the second inverter, the controller may output the second synchronization signal to the first inverter.

Even when the first output signal is received, the first inverter may wait for output of the first high-frequency power until the second synchronization signal is input.

When the second synchronization signal is input, the first inverter may output the first high-frequency power, and when the second output signal is input, the second inverter may output the second high-frequency power.

The controller may sequentially output the first output signal and the second output signal.

According to another embodiment of the present invention, a method of controlling an electric range having a single free-zone burner, which is a method of controlling an electric range for preventing interference noise generated when a single free-zone burner including two or more working coils is operated, includes setting output stages for driving a first working coil and a second working coil according to set high-frequency power, outputting a first output signal including a first output stage signal and a first synchronization signal corresponding to the output stage to a first inverter and outputting the first synchronization signal to a second inverter, outputting a second output signal including a second output stage signal and a second synchronization signal corresponding to the output stage to the second inverter and outputting the second synchronization signal to the first inverter, when receiving the first output signal and the second synchronization signal, converting, by the first inverter, DC power into first high-frequency power according to the first output stage signal and outputting the first high-frequency power to the first working coil, and when receiving the first synchronization signal and the second output signal, converting, by the second inverter, the DC power into second high-frequency power according to the second output stage signal and outputting the second high-frequency power to the second working coil.

The setting of the output stages may be an operation in which, when one of the output stage for driving the first working coil and the output stages for driving the second working coil is set, the other is also set.

Advantageous Effects

According to the present invention, output time points of high-frequency powers output from a plurality of inverters are made to be the same using a synchronization signal, thereby preventing interference noise caused by a difference in resonant frequency between a plurality of working coils.

In addition, according to the present invention, when an output stage signal is output to any one inverter among a plurality of inverters, a synchronization signal is output to other inverters to make output time points of high-frequency powers output from the plurality of inverters the same.

Furthermore, even when any one inverter among a plurality of inverters receives an output stage signal, by waiting for output until synchronization signals of other inverters are input, output time points of high-frequency powers output by the inverters can be made to be the same.

The effects of the present invention are not limited to the above-described effects, and other effects not described above can be clearly derived and understood by one skilled in the art from the following description.

DESCRIPTION OF DRAWINGS

FIG. 4 is a circuit diagram of the control device for an electric range having a single free-zone burner according to the embodiment of the present invention.

FIGS. 5 to 8 are tables exemplarily showing an output signal in an electric range having a single free-zone burner according to an embodiment of the present invention.

MODES OF THE INVENTION

In order to fully understand the configuration and effects of the present invention, exemplary embodiments of the present invention will be described with reference to the accompanying drawings. However, the present invention is not limited to the embodiments disclosed herein, and may be implemented in various forms and modified in various ways. Rather, the description of the embodiments is provided only to make the present invention complete, and to fully inform the scope of the present invention to those skilled in the art. In the accompanying drawings, for convenience of description, the size of the components is illustrated to be larger than the actual size, and the ratio of each component may be exaggerated or reduced.

Terms such as "first" and "second" may be used to describe various components, but the components should not be limited by the terms. The terms may be used only for the purpose of distinguishing one component from another component. For example, without departing from the scope of the present invention, a first component may be referred to as a second component, and similarly, the second component may also be referred to as the first component. Singular expressions may include plural expressions unless the context clearly indicates otherwise. The terms used in the embodiments of the present invention have the same meanings as terms that are generally understood by those skilled in the art, as long as the terms are not explicitly defined differently.

Figure 1:
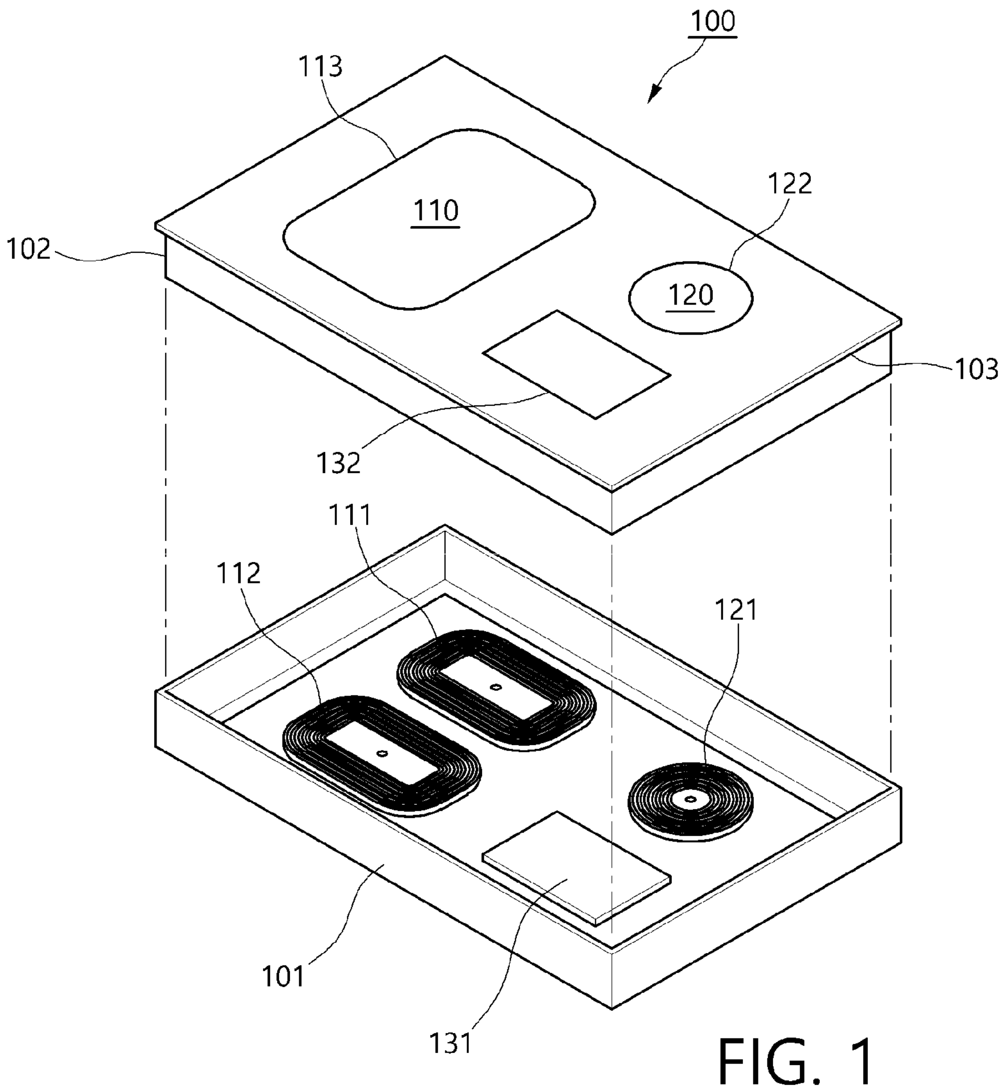
FIG. 1 is a perspective view of an electric range having a single free-zone burner according to one embodiment of the present invention.

FIG. 1 is a perspective view of an electric range having a single free-zone burner according to an embodiment of the present invention.

Referring to FIG. 1, an electric range 100 according to the embodiment of the present invention may include a case 101, a cover 102, a seating plate 103, a first working coil 111, a second working coil 112, a third working coil 121, and an interface 131.

The electric range 100 may include a free-zone burner 110 and a single burner 120. Here, the free-zone burner 110 includes two or more working coils, and the single burner 120 includes one working coil.

Hereinafter, an example in which the free-zone burner 110 includes the first and second working coils 111 and 112 and the single burner 120 includes the third working coil 121 will be described, and since the single burner 120 has the same configuration as the general electric range 100, detailed description thereof will be omitted.

The case 101 accommodates the first working coil 111, the second working coil 112, the third working coil 121, and the interface 131 therein, and the cover 102 is coupled to the case 101 to cover an upper portion of the case 101.

The seating plate 103 is disposed on the cover 102, and an object to be heated, that is, a vessel for cooking food, is seated thereon. Here, the seating plate 103 may be made of a material that is transparent and resistant to heat, for example, a tempered glass material such as ceramic glass.

It is preferable that the first working coil 111 and the second working coil 112 be formed in a quadrangular shape with curved corners in order to uniformly transfer heat to the entire free-zone burner 110. This is because when, the first working coil 111 and the second working coil 112 are formed in a circular shape, a relatively small amount of heat is transferred to an area in which the first working coil 111 and the second working coil 112 face each other.

The third working coil 121 may be formed in a circular shape which is generally a vessel shape, but the present invention is not limited thereto, and the third working coil 121 may be formed in various shapes as needed.

The first working coil 111 and the second working coil 112 are disposed side by side in one direction, and the third working coil 121 is disposed at one side of the first working coil 111 or the second working coil 112.

A free-zone burner area 113 and a single burner area 122 may be indicated on an upper surface of the cover 102. Here, the free-zone burner area 113 may be indicated with a shape surrounding the first working coil 111 and the second working coil 112 at a position corresponding to the first working coil 111 and the second working coil 112. A boundary line may be indicated between the first working coil 111 and the second working coil 112 to distinguish the first working coil 111 and the second working coil 112.

In addition, the single burner area may be indicated with a shape surrounding the third working coil 121 at a position corresponding to the third working coil 121.

For example, the free-zone burner area 113 may be indicated with a quadrangular shape with curved corners to include the first and second working coils 111 and 112 therein, and the third working coil 121 may be indicated with a circular shape to include the third working coil 121 therein.

Alternatively, the free-zone burner area 113 and the single burner area 122 may be formed on a lower or upper surface of the seating plate 103.

Accordingly, since the free-zone burner area 113 and the single burner area 122 are externally visible, when a user places a vessel on the seating plate 103, the user may relatively correctly place the vessel at a position of the first working coil 111, the second working coil 112, and the third working coil 121.

The interface 131 may be disposed at one side of the first working coil 111 or the second working coil 112 and may display various types of information related to the electric range 100. In addition, the interface 131 is used when a user turns the electric range 100 on to receive power or adjusts output stages of the first working coil 111, the second working coil 112, and the third working coil 121. Here, the interface 131 may be implemented as a touch panel allowing information to be input and displayed through a user's touch.

A manipulation area 132 may be indicated on the upper surface of the cover 102 with a shape corresponding to the interface 131 at a position corresponding to the interface 131. In the manipulation area 132, specific characters, images, or the like for user manipulation or information display may be displayed, and various types of information output by the interface 131 may be displayed according to user manipulation or the operation of the electric range 100.

Accordingly, a user can operate the electric range 100 by touching a specific point of the manipulation area 132 with reference to the characters or images displayed in the manipulation area 132 and may check various types of information output by the interface 131.

Figure 2:
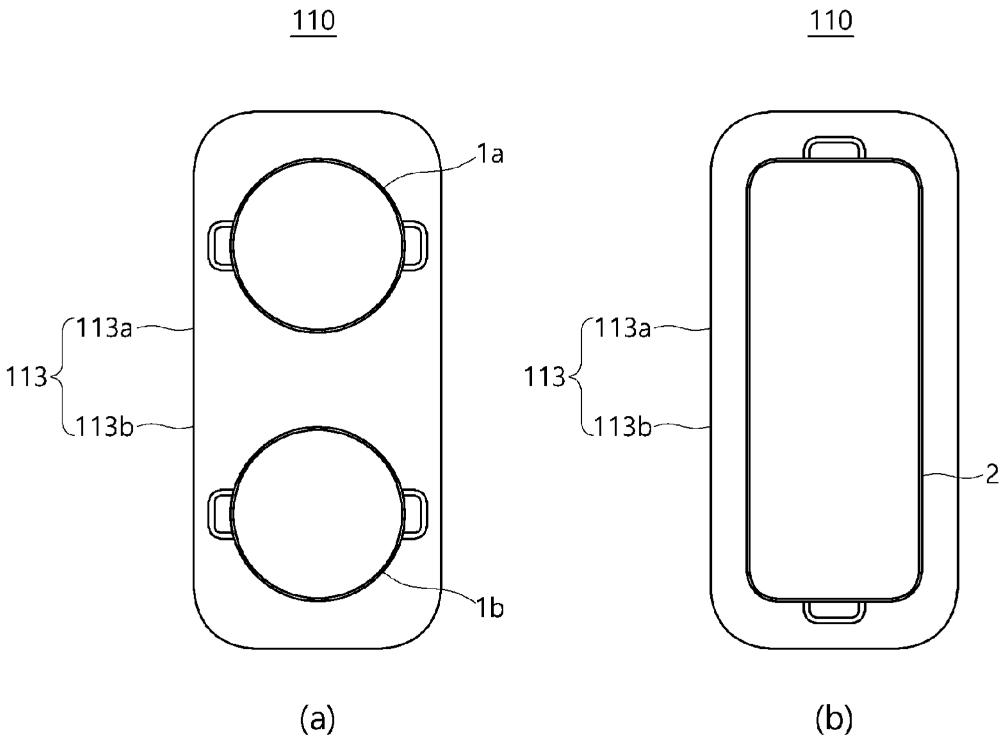
FIG. 2 shows views for describing a use example of a single free-zone burner according to an embodiment of the present invention.

FIG. 2 shows views for describing a use example of a free-zone burner according to an embodiment of the present invention.

Referring to FIG. 2, the free-zone burner area 113 may be divided into a first heating area 113*a* in which the first working coil 111 is positioned under the seating plate 103 and a second heating area 113*b* in which the second working coil 112 is positioned under the seating plate 103.

Here, as shown in FIG. 2A, a user may operate the first working coil 111 after a first vessel 1 is seated, which has a size corresponding to the first heating area 113*a*, on the first heating area 113*a* and may operate the second working coil 112 after a second vessel 2 is seated, which has a size corresponding to the second heating area 113*b*, on the second heating area 113*b*.

In addition, as shown in FIG. 2B, the user may operate the first working coil 111 and the second working coil 112 after a third vessel 3 is seated, which has a size corresponding to the first heating area 113*a* and the second heating area 113*b*, that is, the entirety of the free-zone burner area 113, on the first heating area 113*a* and the second heating area 113*b*.

As described above, in the electric range 100, a plurality of vessels can be placed on the single free-zone burner 110 at the same time to perform cooking, and vessels having various sizes can be heated using the single free-zone burner 110, thereby providing convenience to a user.

Figure 3:
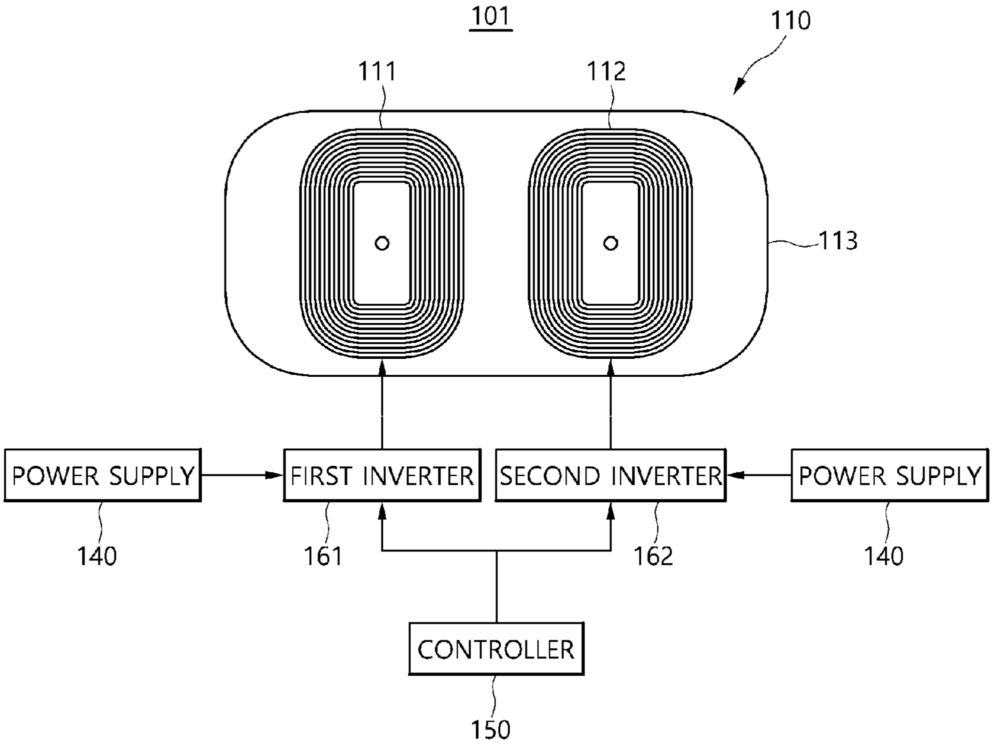
FIG. 3 is a block diagram of a control device for an electric range having a single free-zone burner according to an embodiment of the present invention.
Figures 4, 5:
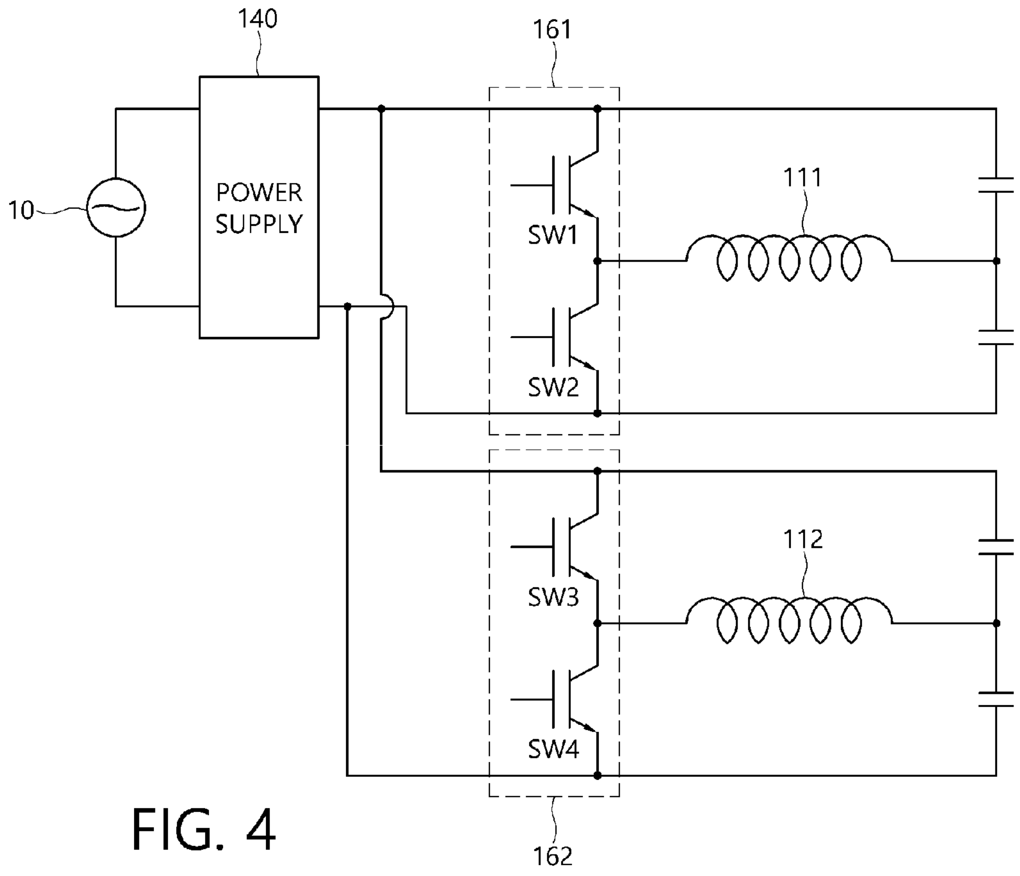

FIG. 3 is a block diagram of a control device for an electric range having a single free-zone burner according to an embodiment of the present invention. FIG. 4 is a circuit diagram of the control device for an electric range having a single free-zone burner according to the embodiment of the present invention.

Referring to FIGS. 3 and 4, a control device 101 for an electric range 100 including a single free-zone burner may include a power supply 140, a controller 150, a first inverter 161, and a second inverter 162. Each of components of the control device 101 may be accommodated inside a case 101.

The power supply 140 receives alternating current (AC) power from a commercial power supply 10, converts the received AC power into direct current (DC) power, and outputs the DC power to the first inverter 161 and the second inverter 161.

The first inverter 161 includes a first switch SW1 and a second switch SW2 connected in series and converts DC power into first high-frequency power by turning the first switch SW1 and the second switch SW2 on or off. The second inverter 162 includes a third switch SW3 and a fourth switch SW4 connected in series and converts DC power into second high-frequency power by turning the third switch SW3 and the fourth switch SW4 on or off.

A first working coil 111 is connected to a connection node of the first switch SW1 and the second switch SW2 included in the first inverter 161 to receive the first high-frequency power, and a second working coil 112 is connected to a connection node of the third switch SW3 and the fourth switch SW4 included in the second inverter 162 to receive the second high-frequency power.

When an output stage for driving the first working coil 111 and the second working coil 112 is set according to set high-frequency power, the controller 150 outputs a first output signal including a first output stage signal and a first synchronization signal corresponding to the set output stage and outputs a second output signal including a second output stage signal and a second synchronization signal corresponding to the set output stage. Here, the controller 150 sequentially outputs the first output signal and the second output signal.

The first output stage signal is a signal for controlling an output stage of the first inverter 161 and is a signal for adjusting an on/off duty ratio of the first switch SW1 and the second switch SW2, and the second output stage signal is a signal for controlling an output stage of the second inverter 162 and is a signal for adjusting an on/off duty ratio of the third switch SW3 and the fourth switch SW4.

The first synchronization signal and the second synchronization signal are signals for synchronizing a time point at which the first inverter 161 outputs the first high-frequency power with a time point at which the second inverter 162 outputs the second high-frequency power.

The controller 150 outputs the first synchronization signal to the second inverter 162 when the first output signal is output to the first inverter 161 and outputs the second synchronization signal to the first inverter 161 when the second output signal is output to the second inverter 162.

The first inverter 161 sequentially receives the first output signal and the second synchronization signal from the controller 150. Specifically, the first inverter 161 first receives the first output stage signal and the first synchronization signal from the controller 150 at the same time and then receives the second synchronization signal separated from the second output signal when the controller 150 outputs the second output signal to the second inverter 162.

Meanwhile, even when the first inverter 161 receives the first output signal, the first inverter 161 waits for the output of the first high-frequency power until the second synchronization signal is input. Then, when the second synchronization signal is input, the first inverter 161 outputs the first high-frequency power.

The second inverter 162 sequentially receives the first synchronization signal and the second output signal from the controller 150. Specifically, the second inverter 162 first receives the first synchronization signal separated from the first output signal when the controller 150 outputs the first output signal to the first inverter 161 and then simultaneously receives the second output stage signal and the second synchronization signal from the controller 150.

Here, since the second inverter 162 already receives the first synchronization signal before receiving the second output signal, the second inverter 162 outputs the second high-frequency power immediately when the second output signal is input.

When the second synchronization signal is input, the first inverter 161 converts DC power into the first high-frequency power according to the first output stage signal received from the controller 150 and outputs the first high-frequency power to the first working coil 111. At the same time, when the second output signal is input, the second inverter 162 converts DC power into the second high-frequency power according to the second output stage signal received from the controller 150 and outputs the second high-frequency power to the second working coil 112.

That is, the first inverter 161 and the second inverter 162 simultaneously output the first high-frequency power and the second high-frequency power when receiving both the first synchronization signal and the second synchronization signal.

FIGS. 5 to 8 are tables exemplarily showing an output signal in an electric range having a single free-zone burner according to an embodiment of the present invention. Specifically, FIGS. 5 and 8 are tables showing an output signal output to a first inverter 161, and FIGS. 6 and 7 are tables showing an output signal output to a second inverter 162.

Hereinafter, a method of controlling an electric range having a free-zone burner according to an embodiment of the present invention will be described with reference to FIGS. 5 to 8.

The output signal includes an output stage signal and a synchronization signal. Here, the output stage signal includes a first output stage signal and a second output stage signal corresponding to a plurality of stages (for example, eight stages), and the synchronization signal includes a first synchronization signal and a second synchronization signal.

Here, the first output stage signal and the first synchronization signal are indicated by dotted line boxes, and the second output stage signal and the second synchronization signal are indicated by solid line boxes. In addition, output stages are provided as a total of eight stages, but less or more output stages than the eight stages may be provided.

First, a user places a vessel 2 on a free-zone burner 110, selects the operation of the free-zone burner 110 through an interface 131, and sets an output stage (for example, a seventh stage) for simultaneously driving a first working coil 111 and a second working coil 112 according to set high-frequency power. In this case, output stages of the first working coil 111 and the second working coil 112 may be the same, and the user may simultaneously set the output stages of the first working coil 111 and the second working coil 112 through a single operation using through the interface 131. That is, when the user sets any one of the output stage for driving the first working coil 111 and the output stage for driving the second working coil 112, the other is also set at the same time.

Next, as shown in FIG. 5, a controller 150 outputs the first output stage signal and a first synchronization signal S1 for the seventh stage corresponding to the set output stage to the first inverter 161, and at the same time, as shown in FIG. 6, the controller 150 outputs the first synchronization signal S1 to the second inverter 162. In this case, the first inverter 161 waits for the output of first high-frequency power because the first inverter 161 receives the first output stage signal for the seventh stage but does not receive a second synchronization signal S2.

Next, as shown in FIG. 7, the controller 150 outputs the second output stage signal and the second synchronization signal S2 for the seventh stage corresponding to the set output stage to the second inverter 162, and at the same time, as shown in FIG. 8, the controller 150 outputs the second synchronization signal S2 to the first inverter 161. In this case, the first inverter 161 is in a state of receiving the first output stage signal for the seventh stage, the first synchronization signal S1, and the second synchronization signal S2, and the second inverter 162 is in a state of receiving the second output stage signal for the seventh stage, the first synchronization signal S1, and the second synchronization signal S2.

Accordingly, at a time point at which the second synchronization signal S2 is input, the first inverter 161 converts DC power into the first high-frequency power according to the first output stage signal for the seventh stage and outputs the first high-frequency power to the first working coil 111, and at a time point at which the second synchronization signal S2 is input, the second inverter 162 converts DC power into second high-frequency power according to the second output stage signal for the seventh stage and outputs the second high-frequency power to the second working coil 112.

That is, the first inverter 161 and the second inverter 162 simultaneously output the first high-frequency power and the second high-frequency power when receiving both the first synchronization signal S1 and the second synchronization signal S2.

Figure 9:
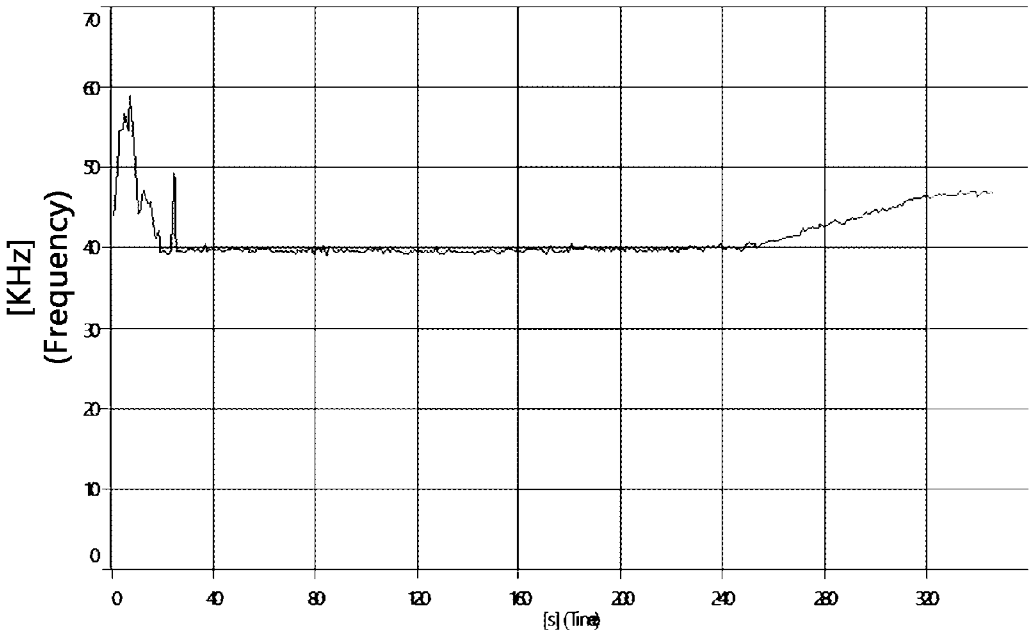
FIG. 9 is a graph of simulating a resonant frequency difference between two working coils in a conventional electric range.
Figure 10:
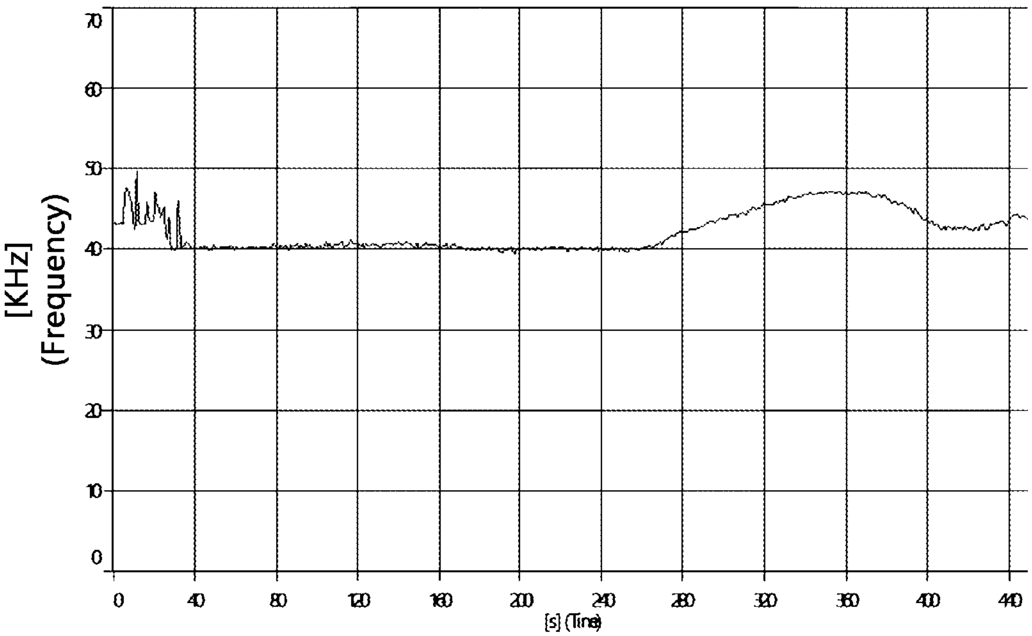
FIG. 10 is a graph of simulating a resonant frequency difference in an initial output period between two working coils in an electric range according to an embodiment of the present invention.

FIG. 9 is a graph of simulating a resonant frequency difference between two working coils in a conventional electric range. FIG. 10 is a graph of simulating a resonant frequency difference between two working coils in an initial output period in an electric range according to an embodiment of the present invention.

In FIGS. 9 and 10, a horizontal axis represents time (s), and a vertical axis represents a resonant frequency difference value (frequency) (kHz).

First, referring to FIG. 9, in the conventional electric range, it can be confirmed that, since output stage signals are sequentially output to two inverters, output time points of high-frequency powers output to working coils are also different, and thus a resonant frequency difference value between the working coils is relatively greater in an initial output period (0 s to 30 s).

Next, referring to FIG. 10, in the electric range according to the embodiment of the present invention, it can be confirmed that, since output time points of high-frequency powers output to working coils by two inverters are made to be the same, in an initial output period (0 s to 30 s), a resonant frequency difference value between the working coils is considerably reduced as compared with the conventional electric range.

As described above, in an electric range having a free-zone burner according to an embodiment of the present invention, output time points of high-frequency powers output from a plurality of inverters are made to be the same using a synchronization signal, thereby preventing interference noise caused by a difference in resonant frequency between a plurality of working coils.

Although specific embodiments have been described in the detailed description of the present invention, various changes may be made without departing from the scope of the present invention. Therefore, the scope of the present invention is not intended to be limited to the specific embodiments set forth above, and should be defined by the appended claims and their equivalents of the present invention, which are described below.

INDUSTRIAL APPLICABILITY

An electric range having a single free-zone burner and a method of controlling the same according to the present invention can be implemented in various home appliances and controllers for controlling the same used at home or industrial sites and thus have industrial applicability.

The invention claimed is:

1. An electric range having a single free-zone burner, which is an electric range for preventing interference noise generated when a single free-zone burner including two or more working coils is operated, the electric range comprising:

a single free-zone burner including a first working coil and a second working coil;

a controller configured to, when output stages for driving the first working coil and the second working coil are set according to set high-frequency power, output a first output signal including a first output stage signal and a first synchronization signal corresponding to the set output stage and output a second output signal including a second output stage signal and a second synchronization signal corresponding to the set output stage;

a power supply configured to output direct current (DC) power;

a first inverter configured to sequentially receive the first output signal and the second synchronization signal, convert the DC power into first high-frequency power according to the first output stage signal, and output the first high-frequency power to the first working coil; and a second inverter configured to sequentially receive the first synchronization signal and the second output signal, convert the DC power into second high-frequency power according to the second output stage signal, and output the second high-frequency power to the second working coil, wherein the first inverter and the second inverter simultaneously output the first high-frequency power and the second high-frequency power when receiving both the first synchronization signal and the second synchronization.

2. The electric range of claim 1, wherein, when the first output signal is output to the first inverter, the controller outputs the first synchronization signal to the second inverter.

3. The electric range of claim 1, wherein, when the second output signal is output to the second inverter, the controller outputs the second synchronization signal to the first inverter.

4. The electric range of claim 1, wherein, even when the first output signal is received, the first inverter waits for output of the first high-frequency power until the second synchronization signal is input.

5. The electric range of claim 1, wherein, when the second synchronization signal is input, the first inverter outputs the first high-frequency power.

6. The electric range of claim 1, wherein, when the second output signal is input, the second inverter outputs the second high-frequency power.

7. The electric range of claim 1, wherein the controller sequentially outputs the first output signal and the second output signal.

8. A method of controlling an electric range having a single free-zone burner, which is a method of controlling an electric range for preventing interference noise generated when a single free-zone burner including two or more working coils is operated, the method comprising:

setting output stages for driving a first working coil and a second working coil according to set high-frequency power;

outputting a first output signal including a first output stage signal and a first synchronization signal corresponding to the output stage to a first inverter and outputting the first synchronization signal to a second inverter;

outputting a second output signal including a second output stage signal and a second synchronization signal corresponding to the output stage to the second inverter and outputting the second synchronization signal to the first inverter;

when receiving the first output signal and the second synchronization signal, converting, by the first inverter, direct current (DC) power into first high-frequency power according to the first output stage signal and outputting the first high-frequency power to the first working coil; and when receiving the first synchronization signal and the second output signal, converting, by the second inverter, the DC power into second high-frequency power according to the second output stage signal and outputting the second high-frequency power to the second working coil.

9. The method of claim 8, wherein the setting of the output stages is an operation in which, when one of the output stage for driving the first working coil and the output stages for driving the second working coil is set, the other is also set.

* * * * *